MULTIFREQUENCY SIGNAL RECEIVER

Filed Nov. 5, 1968 4 Sheets-Sheet 1

United States Patent Office 3,539,731
Patented Nov. 10, 1970

3,539,731

MULTIFREQUENCY SIGNAL RECEIVER

Zenon Legedza, Peabody, Mass., assignor to Bell Telephone Laboratories, Incorporated, Murray Hill and Berkeley Heights, N.J., a corporation of New York

Filed Nov. 5, 1968, Ser. No. 773,591
**Int. Cl. H04m *1/50;* H04q *9/12***
U.S. Cl. 179—84 8 Claims

ABSTRACT OF THE DISCLOSURE

In a multifrequency signal receiver circuit of the general type employed in telephone system central offices, increased protection against false operation in response to spurious input signals is achieved by a combination of interrelated circuit changes which effect a decrease in the signal recognition bandwidth, a reduction in modulation products at low signal levels and an increase in the acceptance threshold in the presence of only a single input signal.

BACKGROUND OF THE INVENTION (1) Field of the invention

This invention relates to multifrequency signaling systems and more particularly to multifrequency signaling receivers.

(2) Description of the prior art

Multifrequency signaling continues to find increasingly widespread use in telephone systems. Multifrequency signals which are now employed, for example, as station generated calling signals by subscribers equipped with pushbutton telephone subsets, typically comprise selected combinations of coincident two-tone bursts in accordance with a frequency code. One illustrative system employing signals of the type indicated is fully described in the January 1960 issue of the Bell System Technical Journal 39 BSTJ 235.

Conventional telephone central office switching equipment of the type employed in the great majority of central offices is responsive only to D.C. signals. Accordingly, if multifrequency signals are employed, it is necessary to utilize a special purpose receiver unit to convert each received signal tone pair into a corresponding pair of space division D.C. signals and then to employ appropriate combinations of these D.C. signals to initiate the operation of the central office switching equipment. Receivers of this type are shown, for example, in U.S. Pat. 3,076,059 issued to L. A Meacham et al. Jan. 29, 1963, and in U.S. Pat. 3,319,011 issued to J. Maurushat, Jr., May 9, 1967.

Multifrequency or single frequency signaling is also employed between central offices and in intra-office signaling and here again converting-receivers of the general type indicated are necessary. Irrespective of the particular end use involved, however, all multifrequency or single frequency signal receivers known heretofore share a number of problems which in one way or another relate to their susceptibility for generating apparently valid output signals in response to spurious input signals, such as speech or noise, for example, notwithstanding the use of a variety of combinations of signal validity tests. Prior art attempts to solve these problems typically involve the use of circuitry that is disproportionately complex, considering the purpose intended, and the results achieved, particularly insofar as reliability is concerned, have not been fully satisfactory.

The general object of the invention, therefore, is to enhance the reliability of multifrequency signal receivers without resorting to increased circuit complexity or additional cost.

SUMMARY OF THE INVENTION

The stated object and additional objects are achieved in accordance with the principles of the invention by a combination of interrelated circuit changes which cooperate to effect a reduction in the signal recognition bandwidth, a reduction of modulation products, particularly at low level signals and an increase in the acceptance threshold in the presence of only a single input signal.

A receiver in accordance with the invention includes: an AGC amplifier to standardize signal amplitude; bandpass filters for the selection of a plurality of signal frequencies; threshold detectors for the recognition of the signaling frequencies; output relays to effect signal translation to connecting switching circuits; a signal present circuit to provide delay in enabling the receiver outputs, which ensures protection against false operation by modulation products or noise and against double registration of a digit; and a gate opening signal detector circuit which keeps the receiver disabled and immune to false operation by speech or noise during critical no-signal periods.

In accordance with one feature of the invention the AGC amplifier circuit maintains the average absolute value of the output constant. It should be noted at this point that for the purposes of this disclosure the term "average value AGC" means the average absolute value AGC, which is to say that a system in accordance with the invention controls the average absolute value of the output or, stated otherwise, the average value of the ideally rectified output. With multifrequency signals, this arrangement narrows the amplitude range of individual frequency components and thus decreases recognition bandwidth variations at the detectors.

Another characteristic of an average value AGC system in accordance with the invention is that it is relatively insensitive to certain types of noise that are in some instances associated with multifrequency signals. The average absolute value detector under such conditions will in effect ignore the presence of noise and operate as if multifrequency signals alone were present. This action ensures that the multifrequency signal individual frequency components of the channel detector will not be reduced in amplitude. In this respect, average value AGC is superior to peak-to-peak AGC which employs a peak-to-peak value detector that generally responds to noise in the presence of multifrequency signals.

Another feature of the invention, which is also embodied in the AGC amplifier, pertains to a nonlinear negative feedback network in the emitter circuit of one of the amplifying transistors which serves to increase the amount of feedback at lower input signal levels, thus reducing modulation products at low signal levels and at the same time maintaining a small change in output signal amplitude over the expected range of input signals.

An additional feature relates to the manner of coupling the signal present circuit to the channel circuits in order to ensure that the signal present threshold is higher than that required for the operation of a channel detector and also to ensure that the effective threshold is higher when only one signaling frequency is present than when two signaling frequencies are present. This arrangement also reduces the possibility of false operation by noise or speech.

Features of a circuit in accordance with the invention not directed specifically to the problem of receiver operation by spurious signals, but which enhance the overall efficiency and reliability of the receiver, include the use of a differential amplifier stage in place of a conventional transformer in the variolosser control circuit of the AGC amplifier which ensures improved transient performance. Further, the variolosser control signal is derived from an intermediate stage of the AGC amplifier, as compared to prior arrangements which typically utilize the output stage for that purpose. This arrangement avoids nonlinearities in the control signal which would otherwise result from transient overloading of the output stages.

DESCRIPTION OF THE EMBODIMENT

Figure 1:
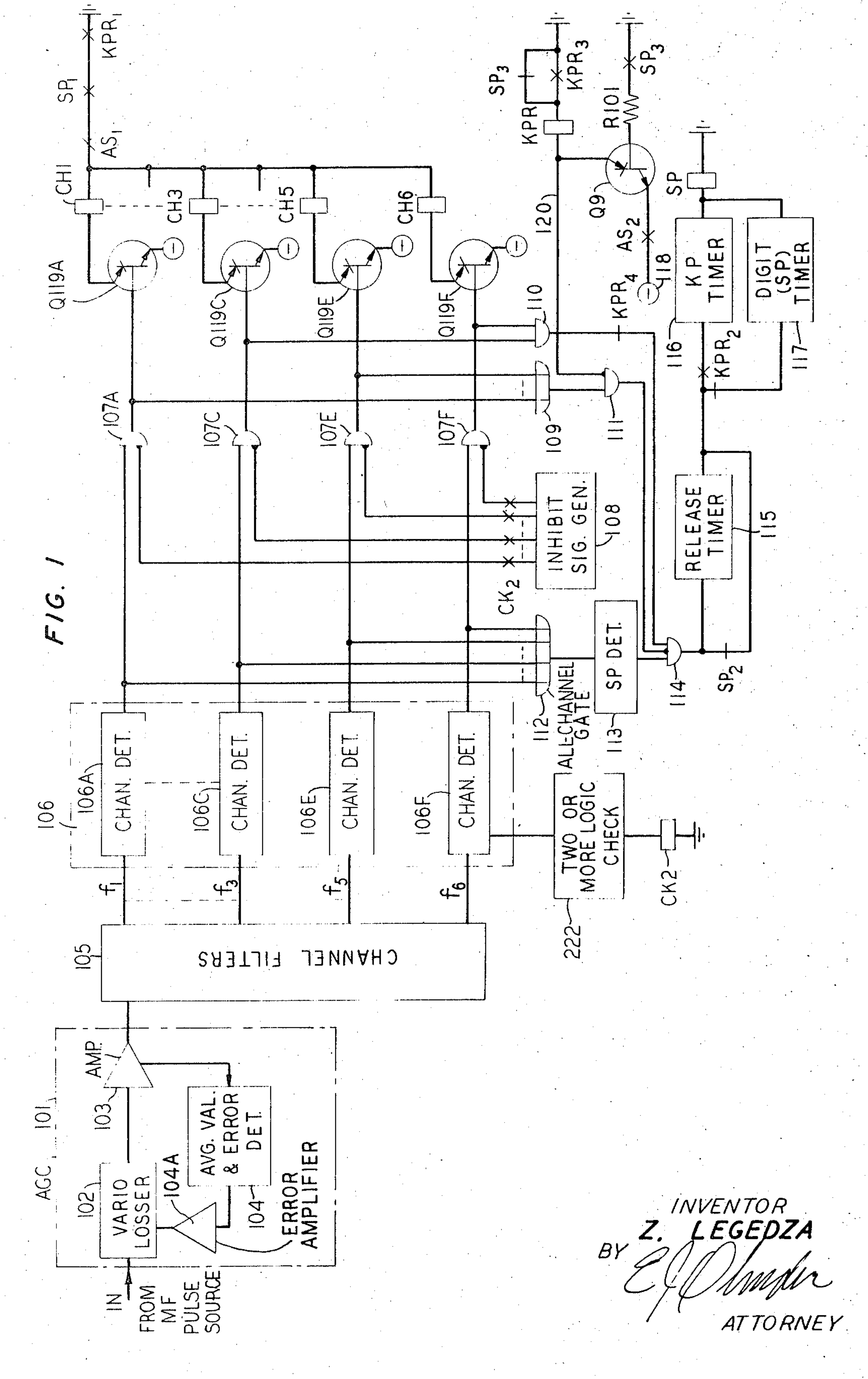
FIG. 1 is a block diagram of a multifrequency receiver in accordance with the invention.

As shown in the block diagram of FIG. 1, an incoming mf. pulse is fed to an AGC circuit 101 which comprises a closed loop servo system, including a variolosser 102, an amplifier 103 and an average value and error detector circuit 104. One of the essential characteristics of the AGC circuit 101 is that it maintains the average absolute value of the output signal constant, in contrast with prior art systems which maintain either the peak-to-peak value or the RMS value of the output signal constant. Additionally, the attack time, which may be on the order of 7 milliseconds, is short compared to the minimum multifrequency pulse length, which is on the order of 30 milliseconds per frequency with 6 milliseconds maximum delay between frequencies. The merit of an average value AGC system in a multifrequency receiver may be assessed by comparing it to the two other possible arrangements indicated, i.e., peak-to-peak AGC and RMS value AGC.

Figure 2:
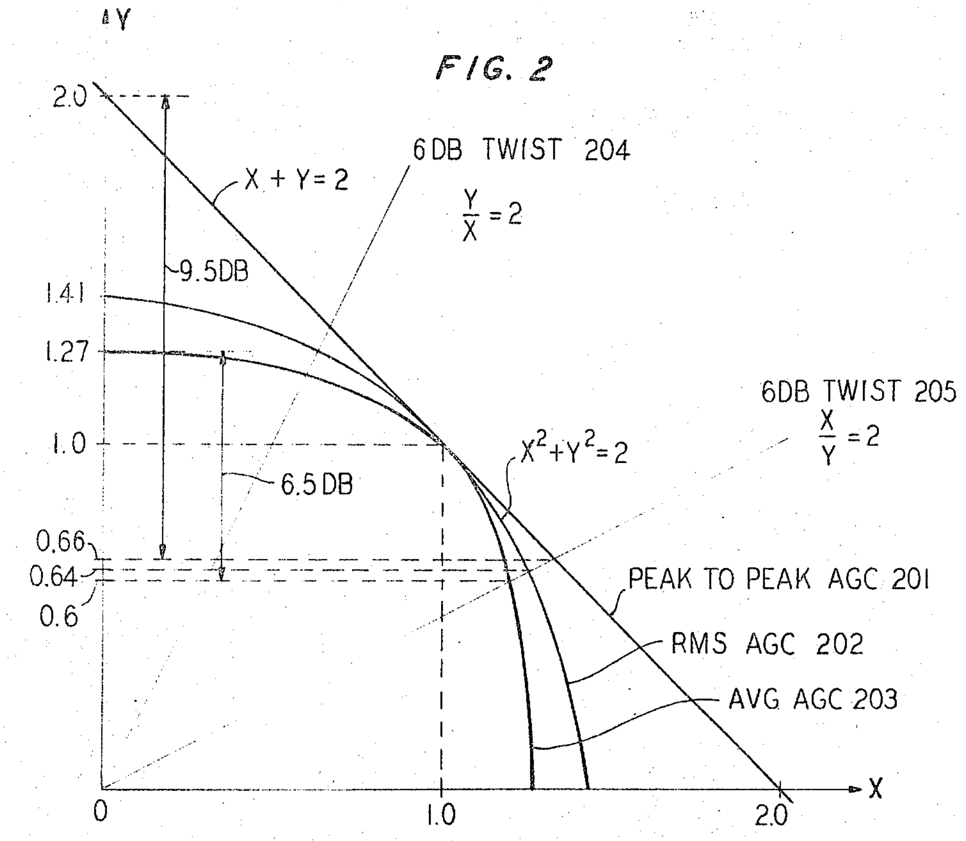
FIG. 2 is a plot of multifrequency signal components comparing the results achieved in an AGC amplifier by maintaining the average absolute value of the output signal constant as compared to the peak-to-peak value and the RMS value.

FIG. 2 illustrates this comparison by showing the amplitude variation of the two frequency components X and Y of an mf. signal at the output of the AGC amplifier for the three different types of AGC detection. For comparison purposes the output amplitudes X and Y for the three types of detection are normalized to 1.0 volt, for the case of two frequencies with equal amplitudes. The curve 201 illustrates the plot of peak-to-peak AGC, the curve 202 illustrates a plot of the RMS AGC, and the curve 203 illustrates, in accordance with the invention, the plot of the average AGC.

As is evident from the plots in FIG. 2, the advantage of employing the average AGC system is that it maintains output amplitudes of the individual signal frequency components more constant with variations in the relative amplitudes of the two signal components than is the case with other types of AGC. It may be noted from the plot that extreme variations in the amplitude of a frequency component at the output occur when only a single frequency is present and also when two frequencies with a relatively large twist factor, such as 6 db, are received. The single frequency case must be considered for the reason that a multifrequency receiver in accordance with the invention is required under certain conditions to operate on such a signal. FIG. 2 shows that the range of extreme variation is 6.5 db for the average type AGC, and increases to 9.5 db for the peak-to-peak AGC, with an intermediate value of approximately 7 db for the RMS AGC. The upper 6 db twist line 204 is a locus for all signal combinations where $Y=2X$ and the lower 6 db twist line 205 is a locus for all signal combinations where $X=2Y$.

As stated above, the plots of FIG. 2 demonstrate that the individual signal frequency components are maintained more constant with variations in relative amplitude of the two components when the average AGC system is employed. The significance of this feature, when utilized in a multifrequency receiver in accordance with the invention, is that for a given bandpass filter characteristic, and a given minimum recognition bandwidth and twist requirement, the average AGC yields a somewhat broader operating bandwidth under normal (equal frequency amplitude) conditions, but a narrower operating bandwidth for a single frequency operation than is achieved with peak-to-peak or RMS detection. As a result, the receiver is less prone to operation by speech or noise.

As shown in FIG. 1 the output from the amplifier 103 is fed to the channel filters 105 and thence to the channel detector 106 which includes the individual detectors 106A–106F. In the absence of an inhibit signal from an inhibit signal generator circuit 108, which signal would be applied by way of the make contacts $CK_2$ of relay CK2 to the inhibit gates 107A–107F, the output from the channel detector 106 is passed by one or two of the gates 107A–107F to turn on one or two of the output transistors Q119A–Q119F. Relay CK2 is operated by way of a two-or-more logic check circuit 222 whenever two or more of the channel detectors 106 are operated. Each transistor output in turn operates a corresponding one of the channel output relays CH1 through CH6, provided that the make contacts $KPR_1$, $SP_1$ and $AS_1$ are closed. The operation of one or more of the relays CH1 through CH6 is employed in conventional fashion to initiate the operation of the related central office switching equipment (not shown) which may be a sender or a receiver for example.

It is evident from the foregoing that the relays corresponding to the $KPR_1$, $SP_1$, $AS_1$ and $CK_2$ make contacts perform a critical function in the control of the receiver. The lower portion of the block diagram of FIG. 1 illustrates the control means employed for establishing the operating sequence of certain of the relays indicated. Before tracing the operation of these control means it should be noted again that a separate one of the channel detector circuits 106A–106F is employed for each of the six possible frequency outputs from the channel filters 105. Each of the outputs from the channel detector 106 thus corresponds to a particular one of six frequencies $f_1$ through $f_6$. An illustrative sequence for these frequencies is as follows:

| | |
|---|---|
| $f_1$=700 Hz. | $f_4$=1300 Hz. |
| $f_2$=900 Hz. | $f_5$=1500 Hz. |
| $f_3$=1100 Hz. | $f_6$=1700 Hz. |

In a normal operating sequence the first signal received is a preparatory or receiver enabling signal, termed a KP signal (denoting key pulse), consisting of the $f_3$ and $f_6$ frequencies. The primary purpose of the KP signal which has a preselected minimum duration on the order of 55 milliseconds, is to enable the receiver for the reception of mf. digit pulses by operating and locking the KPR relay. Prior to the enablement of the receiver, however, the following three conditions must be satisfied for the successful reception of a KP pulse, in addition to a timing condition which is discussed hereinbelow:

(1) The $f_3$ and $f_6$ channel outputs must be added in the all-channel gate 112, and the output from this gate must pass the threshold test imposed by the signal present detector 113.

(2) Both the $f_3$ and $f_6$ channels must be present at the input to the KP channel AND gate 110.

(3) No other channel output may be present at the input to the non-KP channel gate 109.

In the event of the presence of a non-KP channel signal (i.e., $f_1$, $f_2$, $f_4$ or $f_5$) at the gate 109, the signal is passed by the gate 111 as an inhibit input to the gate 114 thus blocking further signal transmission.

If the three conditions indicated above are met for the duration of the operate time, 55 milliseconds for example, of the KP timer 116, a relay SP is operated which in turn causes a PNPN transistor Q9 to conduct, ground potential being applied to the base thereof by way of a make contact $SP_3$ and a resistor R101. The transistor Q9 is thus locked on through its collector load resistor $R_L$. An off-normal battery 118 is connected to the inhibit gate 111 by a conducting path that includes the transistor Q9 and the make contact $AS_2$, a contact of an associated relay AS (not shown), the operation of which serves as a ready indication from the sender or register in the central office. Outputs from the gate 111 are thus blocked and as a result, an output from the gate 109 under these conditions has no effect.

At the termination of the KP pulse the SP relay releases and in doing so causes the KPR relay to operate and lock on its own make contact $KPR_3$. The receiver is now prepared for the reception of mf. digit pulses by virtue of the following conditions:

(1) The ground return path for the windings of the channel relays is closed by way of the make contact $KPR_1$.

(2) The KP channel gate 110 is in effect disconnected by the operation of break contact $KPR_4$. (This action, however, does not have an inhibiting effect on the following gate 114.)

(3) The maximum timing requirement is changed from approximately 55 milliseconds to approximately 25 milliseconds by means of the KPR relay transfer contact $KPR_2$.

Note that in the pre-KP signal state none of the channel relays CH1 through CH6 are permitted to operate, and, therefore, the CK2 relay and its make contacts $CK_1$ which operate whenever two or more channel relays are operated cannot inhibit the inputs to the non-KP channel gate 109. The inhibit signal block 108 may be any suitable inhibiting signal source such as ground or a transistor output, for example, located in and controlled by other central office equipment (not shown) such as a sender or register.

After the receiver has been enabled by a KP signal on the following multifrequency digit pulse as described above, the outputs from the channel detector 106 are applied by way of an all-channel signal gate 112 to a signal present detector circuit 113. The threshold of the signal present detector circuit 113 is designed in accordance with the invention so that the detector will operate if a single signaling frequency is present but will normally not operate when two frequencies are present unless both frequencies are signaling frequencies. This feature is made possible by virtue of the fact that a single frequency is higher in amplitude at the output of the AGC circuit 101 than either of the individual components of a two-frequency signal. The consequence of this feature is a high degree of protection against false operation by noise.

As explained above, if two or more of the channel relays CH1–CH6 are operated, the CK2 relay operates thereby inhibiting all the gates 107A–107F at the first stage output of the channel detectors. As a result, after the operation of the CK2 relay, no additional channel relays can be operated. Operation of the SP relay also activates the slow release timer 115 by opening the shunt path with break contact $SP_2$. With the release timer 115 activated, signal breaks of up to some preselected duration, such as 12 milliseconds, in the output of the signal present detector 113 are ignored and do not cause the SP relay to release. Accordingly, no change occurs in the condition of the channel relays. The SP relay releases in about 12 milliseconds after the termination of the signal present detector output.

Figure 3:
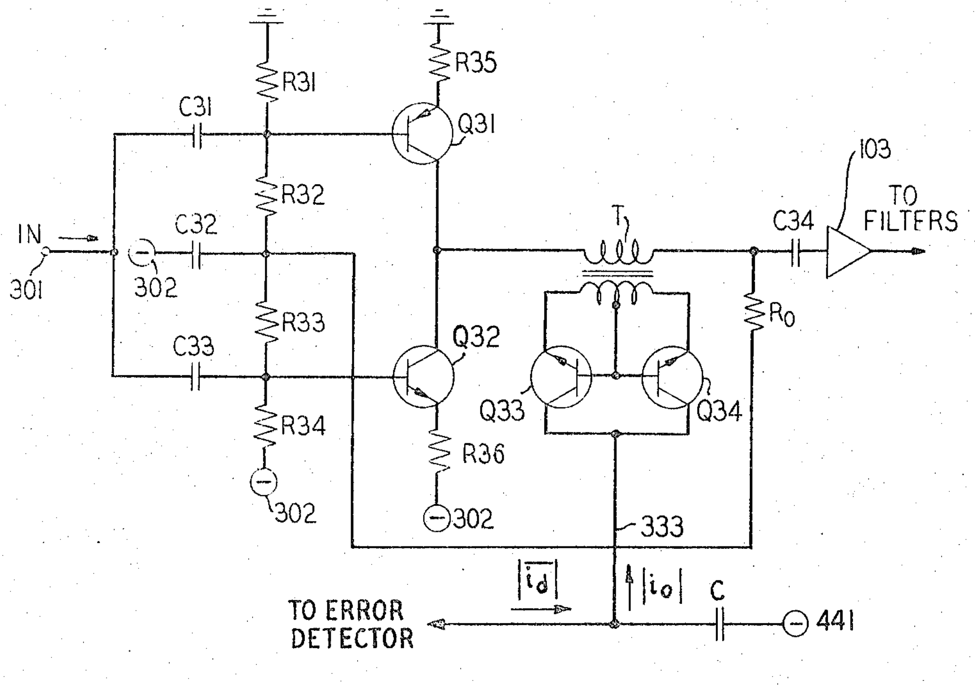
FIG. 3 is a schematic circuit diagram of a circuit for deriving the average value of the output current from an intermediate stage of the AGC amplifier.

A number of the elements shown in block form in FIG. 1 consist of individual circuits or circuit combinations that are substantially conventional and accordingly these are not shown or described in detail herein. To ensure completeness and clarity, however, significant portions of certain key circuits are shown in detail in FIGS. 3, 4 and 6. FIG. 3, for example, shows the circuitry employed for deriving the average value of the output current at an intermediate stage of the AGC amplifier. In accordance with the invention, an intermediate stage is utilized for this purpose in order to avoid the effects of those nonlinearities in the output current that typically occur at the higher voltage levels present in the final stage, owing to transistor saturation and transistor cutoff during transients. As a result, faster transition response and shorter attack time are achieved.

From the intermediate input point 301 of that portion of the AGC amplifier shown in FIG. 3, the signal is applied by way of coupling capacitors C31 and C33 to a push-pull amplifier which includes complementary transistors Q31 and Q32 along with the resistors R31 through R36 which establish biasing levels from the voltage source 302. The essential characteristic of this amplifier is that because of its complementary symmetry, no D.C. current is permitted to flow through the primary winding of the current transformer T, thus permitting the use of a transformer of relatively small size. Normally, however, the symmetry of the circuit is less than perfect, and a certain small amount of D.C. current does in fact flow through the primary of transformer T. However, a feedback path which includes resistors $R_0$, R31 and R32 directs this D.C. current to the biasing network and readjusts the biasing levels of transistors Q31 and Q32 so that the net D.C. current through the primary of transformer T is minimized. This self-correct feature of the circuit ensures maximum linearity in the operation of transformer T which is a link in the AGC average absolute value detector. To prevent the signal current from entering the biasing network, capacitor C32 is employed to shunt the signal current to ground. Output current averaging is achieved by means of a rectifier circuit in the secondary of the current transformer T, which rectifier employs transistors Q33 and Q34 and a filtering capacitor C. Since the transformer T is a current transformer, the secondary being connected to an essentially zero impedance load, the signal voltage drop across the primary is at or near zero. Thus the output sensing for the AGC operation has practically no loading effect on the signal amplifier.

Figure 4:
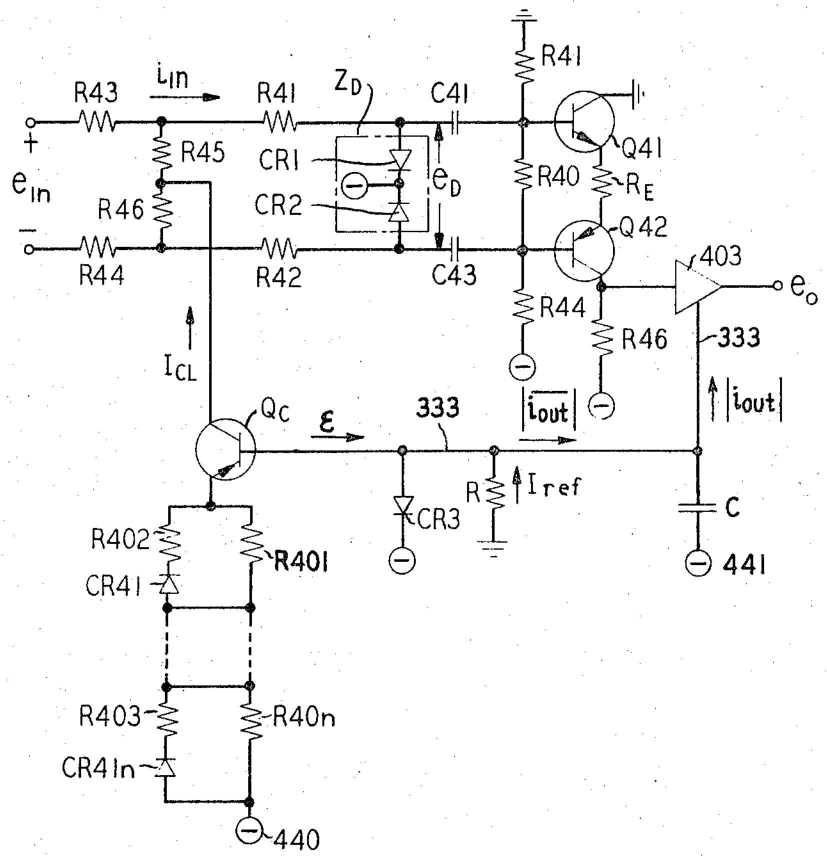
FIG. 4 is a schematic circuit diagram of the variolosser and gain control circuit of the AGC amplifier.

The circuit of FIG. 3 is included within the amplifier stage block 403 shown in FIG. 4. The circuit of FIG. 4 shows additional details of the AGC amplifier including the variolosser circuit 102 and the error detector circuit 104 which are shown in block form in FIG. 1. To assist in the orientation of FIGS. 3 and 4 it may be noted that the feedback lead 333 is shown in both of these figures.

As shown in FIG. 4, the input pulse voltage $e_{in}$ is applied across the variolosser impedance $Z_D$, which includes the individual impedances of the varistors CR1 and CR2, by way of a resistive network comprising resistors R41 through R46. That portion of the signal current not shunted by the variolosser impedance $Z_D$ is applied by way of the coupling capacitors C41 and C43 to the differential amplifier which includes the transistors Q41 and Q42 and the resistors R40, R41, R44, R46 and $R_E$. As described above the average value of the output current is derived at an intermediate stage, which stage is represented by the amplifier stage 403 in FIG. 4. The average current applied to lead 333 is fed to the base of the error current transistor $Q_C$ and is compared with a reference current $I_{ref}$ through resistor R. The resulting error current $\epsilon$ may then be defined as:

$$\epsilon=|\overline{i_{out}}|-I_{ref} \qquad (1)$$

where $$|\overline{i_{out}}|$$

is the average absolute output current applied to lead 333, and the output current $I_{CL}$ at the collector of transistor $Q_C$ may be defined as:

$$I_{CL}=\beta\epsilon \qquad (2)$$

where $\beta$ is the conventional current amplification factor. The level of the control current $I_{CL}$ is also controlled uniquely by the ladder network comprising the resistors R40*l* through R40*n* and the diodes CR4*l* through CR4*n*. In the emitter circuit of transistor $Q_C$ the resistance *r* of the ladder network is a function of the control current $I_{CL}$. Thus, as the control current increases, additional ones of the diodes CR4*l* through CR4*n* break down, which serves to decrease the resistance *r* between the emitter of transistor $Q_C$ and the power supply 440.

The final error current, determined as described, controls the dynamic impedance of the diodes CR1 and CR2 in the variolosser and, therefore, the voltage $e_D$. The differential amplifier stage described above serves to eliminate from the final output those longitudinal (common mode) voltages which result from suddenly applied control current. In order to reduce the duration of transients at the output, capacitor C is precharged from the power supply 441 to some preselected level, which may be on the order of −18 volts, so that when an mf. input pulse is applied to the circuit, the charging of the capacitor does not have to start from zero.

Figure 5:
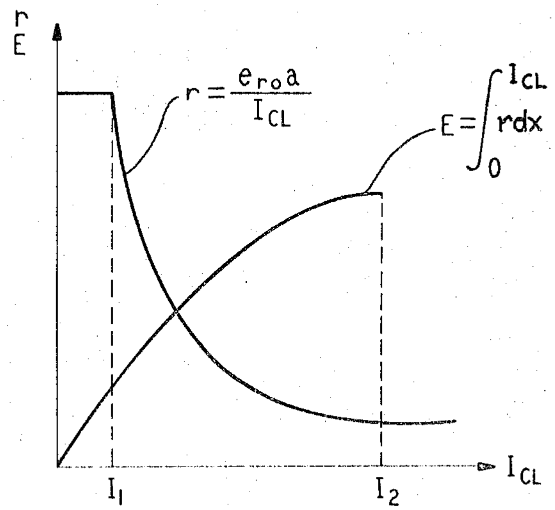
FIG. 5 is a plot illustrating the derivation of the characteristics of a nonlinear resistance employed in the variolosser circuit.

The plot in FIG. 5 serves to illustrate how those modulation products in the variolosser 102 that are caused by ripple in the control current $I_{CL}$ are minimized by inserting in series with the emitter of transistor $Q_C$ the equivalent of a nonlinear resistor *r*, as described above, which provides a negative feedback effect in transistor $Q_C$. Since with active automatic gain control the amplifier output amplitude is essentially constant, the A.C. component of control current applied to the base of transistor $Q_C$ is also constant. This condition would normally result in a higher ratio of A.C. to D.C. components over control current at low values of D.C. control current. By reducing the A.C. emitter resistance with increasing control current, however, the ratio of the ripple current $i_C$ to the control current $I_{CL}$ is maintained constant and below an acceptable minimum. As a result, the 2A–B modulation products are kept below troublesome levels. If a high constant value of resistance were used instead to minimize the A.C. component of control current, the reference current $I_{ref}$ would increase with increasing control current, and the result would be an excessive slope in the AGC response.

In one embodiment of the invention of the type described herein, the channel filters 105 of the receiver were observed to provide uniform output within 1 db in the mf. signal bands $fo \pm(.015\ fo+10)$ Hz. where *fo* is nominal midband frequency in Hz. The separation between individual channels was measured at approximately 20 db which, considering the range of the output from the AGC amplifier (approximately 6.5 db±1 db) is considered to be adequate to ensure good protection against spillover from adjacent channels and against false operation on 2A–B modulation products.

Figure 6:
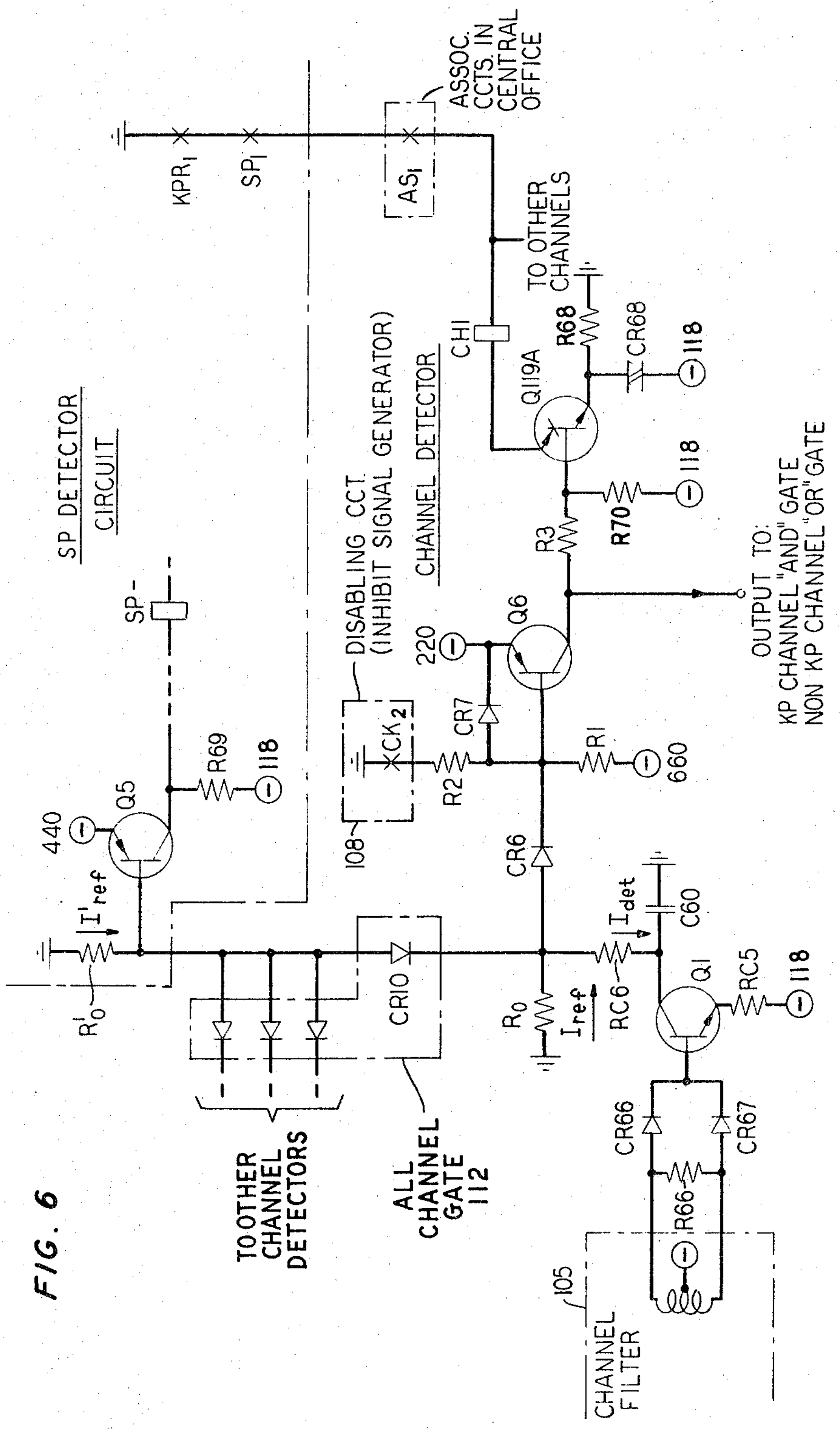
FIG. 6 is a schematic circuit diagram of a channel detector circuit.

Details of one of the channel detector circuits shown in block form in FIG. 1 are shown in FIG. 6. Each of the channel detectors 106 employs a pair of diodes CR66 and CR67 which full-wave rectify the channel filter output signal. The rectified signal is amplified by the first stage comprised of transistor Q1 together with capacitor C60 and resistors RC5, RC6 and $R_0$. Capacitor C60 removes the A.C. components of the rectified signal. The D.C. component through resistor RC6 will be proportioned to the average value of the channel filter output rather than peak value. This type of detection, as discussed above, has been found, in accordance with the invention, to be superior to peak detection with respect to both noise and speech immunities.

The detector threshold is determined by a reference current $I_{ref}$ flowing through resistor $R_0$ and diodes $CR_6$ and $CR_7$ to voltage supply 440. This is the same voltage supply that is used to determine the reference current in the AGC amplifier, thus ensuring good tracking between AGC outputs and channel detector threshold levels. When the average detector current $I_{det}$ through resistor RC6 is equal to or greater than $I_{ref}$, current ceases to flow through diode CR6 and gate transistor Q6 turns on. The output of transistor Q6 is applied by way of the resistor R3 to the PNPN device Q119A which then conducts. Transistor Q119A is biased by the resistors R68 and R69 and by the varistor CR68 from the battery voltage source 118. The corresponding channel relay CH1 then operates provided that the loop to ground is closed as described above in connection with the discussion of FIG. 1.

Also shown in FIG. 6 is the first stage of the signal present detector (SP–DET.) 113 shown in block form in FIG. 1. This first stage of the SP detector comprises the resistor $R'_0$, the transistor Q5 and the resistor R69. Diodes CR10 (one per channel) correspond to the all-channel gate 112 of FIG. 1. The SP detector threshold is determined by the reference current $I'_{ref}$ flowing through the resistor $R'_0$ and by the diodes CR10 of each of the individual channel detector circuits. With no signal present, this current flows through the diodes CR6 and CR7 and through the corresponding circuit elements of each of the other channel detectors, not shown. When a channel detector conducts and the current $I_{det}$ through the resistor RC6 exceeds the current $I_{ref}$ flowing through the resistor $R_0$, current from the SP detector is diverted from the diode CR6 to the resistor RC6. When the sum of each current difference $(I_{det}-I_{ref})$ from all conducting detectors exceeds $I'_{ref}$, the SP detector transistors Q5 starts to conduct. Thus, it may be seen that if two channel detectors are conducting, the current $I_{det}$ for each channel at the point of SP detector operation may be smaller than if only a single channel detector is conducting. Accordingly, the SP detector threshold is higher for a single signaling frequency than it is for two signaling frequencies.

It should be noted further that in order to operate a detector gate transistor Q6, the voltage at the junction of resistor $R_0$, resistor RC6 and diode CR6 must be approximately equal to the potential from the voltage supply 440; while in order to operate the SF threshold transistor Q5, the voltage at the junction indicated must be approximately two diode drops below the voltage supply 440. Thus, the threshold for the SP circuit is higher than that required for signal operation.

It is to be understood that the embodiment described herein is merely illustrative of the principles of the invention. Various modifications thereto may be effected by persons skilled in the art without departing from the spirit and scope of the invention.

What is claimed is:

1. A multifrequency signal receiver comprising, in combination, an input point, a multistage AGC amplifier, means including a variolosser circuit for applying signals from said point to said amplifier, means for deriving a control signal for said variolosser circuit from an intermediate stage of said amplifier, a plurality of channel detector circuits for detecting output signals from said amplifier, a common source for providing a threshold current for said detector circuits and a control voltage for said amplifier, and output means responsive to outputs from said detector circuits for translating multifrequency signals into space division output indicators.

2. Apparatus in accordance with claim 1 wherein said AGC amplifier includes means for maintaining constant an average absolute value of the output from said amplifier, thereby narrowing the amplitude range of individual frequency components and decreasing recognition bandwidth variations at said detector circuits.

3. Apparatus in accordance with claim 2 wherein said AGC amplifier circuit further includes a plurality of amplifying transistors and a nonlinear negative feedback circuit in the emitter circuit of one of said transistors, whereby the amount of feedback at lower signal levels is increased and modulation products at lower signal levels are reduced while maintaining at a low level changes in output signal amplitude in comparison to the range of amplitude variations in the input signals.

4. Apparatus in accordance with claim 2 including means for raising the effective threshold response level of said detector circuits in the presence of a single frequency input signal as compared to said threshold level in the presence of multifrequency signals thereby to reduce the likelihood of spurious detector circuit operation by noise or speech.

5. A multifrequency signal receiver comprising, in combination, an input point, a multistage AGC amplifier, means including a variolosser for applying signals from said point to said amplifier, means for drawing a control signal for said variolosser circuit from an intermediate stage of said amplifier, a plurality of channel detector circuits for detecting output signals from said amplifier, and output means responsive to outputs from said detector circuits for registering space division output of multifrequency signals applied to said input point, said intermediate stage comprising a differential stage of amplification, said deriving means including a rectifier circuit and a transformer for applying a part of the output from said intermediate stage to said rectifier, and said deriving means further including an error detector circuit connected between said rectifier and said variolosser.

6. Apparatus in accordance with claim 5 wherein said error detector circuit includes a transistor having the base electrode thereof connected to the output of said rectifier, the collector electrode thereof connected to said variolosser and the emitter electrode thereof connected to a power supply by means of a current responsive incrementally variable resistance network.

7. Apparatus in accordance with claim 6 wherein said resistance network comprises a ladder network of resistive devices and diodes whereby the total resistance of said ladder network is a function of the current flowing into said emitter electrode.

8. Apparatus in accordance with claim 6 wherein said error detector circuit further includes a resistive element connected between said base electrode and a reference potential, the difference between the current flowing through said resistive element and the output current from said rectifier being partially determinative of the magnitude of the final error current applied to said variolosser.

References Cited

UNITED STATES PATENTS 3,319,011 5/1967 Maurushat.

WILLIAM C. COOPER, Primary Examiner

W. A. HELVESTINE, Assistant Examiner